(12) United States Patent
Dmitriev-Zdorov

(10) Patent No.: US 10,740,506 B2
(45) Date of Patent: *Aug. 11, 2020

(54) STATISTICAL CHANNEL ANALYSIS WITH CORRELATED MULTIPLE-LEVEL INPUT MODULATION

(71) Applicant: Mentor Graphics Corporation, Wilsonville, OR (US)

(72) Inventor: Vladimir B. Dmitriev-Zdorov, Longmont, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/181,152

(22) Filed: Jun. 13, 2016

(65) Prior Publication Data

US 2016/0371409 A1 Dec. 22, 2016

Related U.S. Application Data

(63) Continuation-in-part of application No. 14/793,579, filed on Jul. 7, 2015.
(Continued)

(51) Int. Cl.
*G06F 30/20* (2020.01)
*G06F 30/367* (2020.01)
(Continued)

(52) U.S. Cl.
CPC .......... *G06F 30/20* (2020.01); *G06F 30/367* (2020.01); *G06F 2111/08* (2020.01);
(Continued)

(58) Field of Classification Search
CPC .. G06F 17/5009; G06F 17/50; G06F 17/5036; G06F 30/00; G06F 30/367; G06F 30/20; H04L 41/45
See application file for complete search history.

(56) References Cited

U.S. PATENT DOCUMENTS 5,515,387 A * 5/1996 Smith ............... H04L 25/03178
714/746
7,295,604 B2 11/2007 Cranford, Jr. et al.
(Continued)

OTHER PUBLICATIONS

Min, Byungho, Keytaek Lee, and Samuel Palermo. "A 20 Gb/s triple-mode (PAM-2, PAM-4, and duobinary) transmitter." Microelectronics Journal 43.10 (2012): 687-696. (Year: 2012).*
(Continued)

*Primary Examiner* — Omar F Fernandez Rivas
*Assistant Examiner* — Joshua E. Jensen
(74) *Attorney, Agent, or Firm* — Mentor Graphics Corporation

(57) ABSTRACT

This application discloses a computing system configured to identify a channel in an electronic device is configured to transmit signals encoding data with more than two value levels in response to a correlated test input. The computing system can determine probabilities of value level changes in the transmitted signals based on an encoding for the correlated test input, and measure a step response of the channel. The computing system can perform statistical simulation or analysis on the channel based, at least in part, on the step response of the channel and the determined probabilities of value level changes in the transmitted signals, which can predict a signal integrity of the channel configured to transmit the signals based, at least in part, on the determined probabilities of value level changes in the transmitted signals.

20 Claims, 9 Drawing Sheets

Related U.S. Application Data

(60) Provisional application No. 62/175,048, filed on Jun. 12, 2015, provisional application No. 62/021,561, filed on Jul. 7, 2014.

(51) Int. Cl.
   *H04L 12/24* (2006.01)
   *H04L 12/26* (2006.01)
   *G06F 111/08* (2020.01)

(52) U.S. Cl.
   CPC .......... *H04L 41/145* (2013.01); *H04L 43/08* (2013.01); *Y04S 40/168* (2013.01)

(56) References Cited

U.S. PATENT DOCUMENTS

| | | | |
|---|---|---|---|
| 7,738,602 B2 | 6/2010 | Langenbach et al. | |
| 8,660,811 B2* | 2/2014 | Miller | G01R 31/3171 324/620 |
| 9,496,993 B1* | 11/2016 | Miller | H04L 1/205 |
| 2005/0111536 A1* | 5/2005 | Cranford, Jr. | H04B 3/462 375/226 |
| 2007/0092018 A1* | 4/2007 | Fonseka | H04L 1/0054 375/265 |
| 2013/0041645 A1* | 2/2013 | Kawata | G06F 17/5036 703/14 |
| 2015/0276839 A1* | 10/2015 | Liu | G06F 17/5036 703/2 |

OTHER PUBLICATIONS

Holzlohner, Ronald, et al. "Accurate calculation of eye diagrams and bit error rates in optical transmission systems using linearization." Journal of Lightwave Technology 20.3 (2002): 389-400. (Year: 2002).*

Stojanovic, Vladimir, and Mark Horowitz. "Modeling and analysis of high-speed links." Custom Integrated Circuits Conference, 2003. Proceedings of the IEEE 2003. IEEE, 2003. (Year: 2003).*

Subbalakshmi, Koduvayur P., and Jacques Vaisey. "On the joint source-channel decoding of variable-length encoded sources: The additive-Markov case." IEEE transactions on communications 51.9 (2003): 1420-1425. (Year: 2003).*

Subbalakshmi, Koduvayur et al; "On the joint source-channel decoding of variable-length encoded sources: The additive-Markov case"; IEEE transactions on communications; vol. 51; No. 9, 2003, pp. 1420-1425.

Kossel Marcel A. and Schmatz, Martin L., "Jitter Measurements of High-Speed serial links" IEEE Design & Test of Computers (2004), pp. 536-543 (Year 2004).

Sanders Anthony. "Statistical Simulation of Physical Transmission Media." IEEE Transactions on Advanced Packaging 32.2 (2009), pp. 260-267. (Year 2009).

M. Tsuk, D. Dvorscsak, C.S. Ong, and J. White, "An electrical-level superimposed-edge approach to statistical serial link simulation," IEEE/ACM International Conf. on Computer-Aided Design Digest of Technical papers, Nov. 2, 2009, pp. 718-724.

F. Rao, V. Borich, H. Abebe, M. Yan, "Rigorous modeling of transmit jitter for accurate and efficient statistical eye simulation," DesignCon 2010, Feb. 1, 2010.

D. Oh, "Modeling and simulation of common clocking topologies for statistical link simulation," DesignCon 2011, Feb. 1, 2011.

N. Blitvic, V. Stojanovic, "Statistical simulator for block coded channels with long residual interference," IEEE International Conf. on Communications, Jun. 24, 2007.

K. Balasubramanian, S. Agili, and A. Morales, "Investigating the new 64b/66b encoding scheme's power spectral density," IEEE International Conf. on Consumer Electronics (ICCE), Jan. 9, 2011.

Dan Oh, "Multiple edge responses for fast and accurate system simulation," IEEE Electrical Performance of Electronic Packaging, Oct. 23, 2006, pp. 163-166.

JiHong Ren, Kyung Suk Oh, "Multiple edge responses for fast and accurate system simulation, IEEE Trans. On Advanced Packaging," V.31, No. 4, Nov. 28, 2008.

V. Stojanovic and M. Horowitz, "Modeling and analysis of high-speed links," Proc. IEEE Custom Integrated Circuit Conf., Sep. 21, 2003, pp. 589-594.

D. Oh, F. Lambrecht, S. Chang, Q. Lin, J. Ren, C. Yuan, J. Zerbe, and V. Stojanovic, "Accurate system voltage and timing margin simulation in high-speed I/O system designs," IEEE Trans, on Advanced Packaging, v.31, No. 4, May 2, 2008.

V. Dmitriev-Zdorov, M. Miller, C. Ferry, "The jitter-noise duality and anatomy of an eye diagram," DesignCon, 2014, Jan. 28, 2014.

S. Apostolov et al, "High-order correlation functions of binary multi-step Markov chains," arXiv:physics/0610081, v1, physics. data-an, Oct. 11, 2006.

* cited by examiner

STATISTICAL CHANNEL ANALYSIS WITH CORRELATED MULTIPLE-LEVEL INPUT MODULATION

RELATED APPLICATION

This application claims priority to U.S. Provisional Patent Application Ser. No. 62/175,048, filed Jun. 12, 2015, and is a continuation-in-part of U.S. patent application Ser. No. 14/793,579, filed Jul. 7, 2015, which claims priority to U.S. Provisional Patent Application Ser. No. 62/021,561, filed Jul. 7, 2014, all of which are incorporated by reference herein.

TECHNICAL FIELD

This application is generally related to electronic design automation and, more specifically, to statistical channel analysis with correlated multiple-level input modulation.

BACKGROUND

Modern digital electronic circuits and systems can transmit or convey sequences of binary values, commonly referred to as bit sequences or digital signals. These bit sequences can be conveyed as voltage waveforms, wherein the voltage amplitude for a given time period or bit, corresponds to a binary logic value at that same time period. Accordingly, a digital signal can appear as a voltage waveform in the signal lines and transmission channels of electronic systems. As a digital signal is transmitted through a circuit, various effects may cause the signal to degrade, often to the point that errors occur. Errors within a digital signal may be quantified by a bit error rate. In many instances, the bit error rate of a circuit or signal pathway is defined as the ratio of incorrectly received bits to the total number of bits transmitted. An important consideration in digital electronic design is fidelity, or the quality with which a signal is conveyed. The fidelity of an electronic system is often referred to as signal integrity. As designers have increased the speed of operation and manufacturing has scaled the physical dimensions of today's modern circuits, signal integrity has become increasingly more important. Currently, virtually all electronic circuits are designed with signal integrity in mind.

Digital electronic designers often employ techniques to determine signal integrity of their designs. For example, these designers can utilize simulation tools to perform time-domain simulation on the channel to identify signal integrity problems before the device is manufactured. These simulation tools can allow the designer to account for issues that commonly cause signal degradation, such as ringing, crosstalk, noise, ground bounce, or inter-symbol interference. Time-domain simulation, however, is often time and resource intensive. From a practical standpoint, many designers can only simulate a channel for around 10,000,000 to 100,000,000 bits, which can provide a bit error rate of around 1e-7 to 1e-8, or one error every 10,000,000 to 100,000,000 bits. Current standards and reliability for channels, however, calls for bit-error rates of around 1e-12 to 1e-15, which would take four plus orders of magnitude longer to realize utilize time-domain simulation on the channel.

In an attempt to predict channel reliability in the face of the time-limitation imposed by bit-by-bit simulation, many designers implement peak distortion analysis. Peak distortion analysis often includes generation of a "worst-case input pattern" that, when input to the channel, would create a most-stressed or most-pessimistic prediction for an eye diagram associated with the channel. While this approach can allow designers to create a boundary of the eye diagram, it does not produce accurate bit error rate and creates over-pessimistic prediction of signal integrity.

Another form of channel reliability prediction is statistical simulation of the channel. Statistical simulation can determine probability distributions that describe eye-diagram, allowing predictions of the bit error rate BER as low as 1e-15 to 1e-20 bits and beyond, with minimal computational resources. Most conventional statistical simulation, however, incorporates many simplifications, such as an assumption that the channel is linear time-invariant (LTI), an assumption that jitter and noise is non-correlated, and an assumption that input bits are statistical independence, i.e. no correlation between bit-values in the input pattern. These simplifications eliminate the utilization of statistical simulation for analyzing many channels, such as those utilizing data encoding, such as 64b/66b, 128b/130b encoding, those utilizing a non-linear transmitter, and the like.

In an effort to increase data throughput on transmission channels, many designers are moving away from binary encoded transmissions—having either a high voltage level or a low voltage level transmitted on the transmission channel—during a time frame. Instead these designers are implementing signal encoding for transmission channels that have additional or intermediate voltage levels, more than two voltage levels, which can increase the amount of data transmitted during the same time frame. These multi-level signal encoding techniques, however, increase complexity of transmission and reception processing, and determination of signal integrity for the transmission channels.

SUMMARY

This application discloses a computing system to include a channel analysis tool to perform statistical simulation on a channel receiving a test input encoded according to a correlated value pattern. The correlated value pattern can correspond to a multi-level signaling protocol, for example, having more than two value levels. The correlated value pattern can also be driven onto the channel with a non-linear driver that can introduce transmit jitter and an edge response that varies based on a value-depth history, both of which can alter signal integrity of the channel.

In some embodiments, the computing system can be configured to identify the channel in the electronic device is configured to transmit signals encoding data with more than two value levels in response to a correlated test input. The computing system can determine probabilities of value level changes in the transmitted signals based on an encoding for the correlated test input, and measure a step response of the channel. The computing system can perform statistical simulation or analysis on the channel based, at least in part, on the step response of the channel and the determined probabilities of value level changes in the transmitted signals, which can predict a signal integrity of the channel configured to transmit the signals based, at least in part, on the determined probabilities of value level changes in the transmitted signals. Embodiments of statistical simulation on a channel receiving a correlated bit pattern are described in greater detail below.

DETAILED DESCRIPTION

Illustrative Operating Environment

Figure 1:
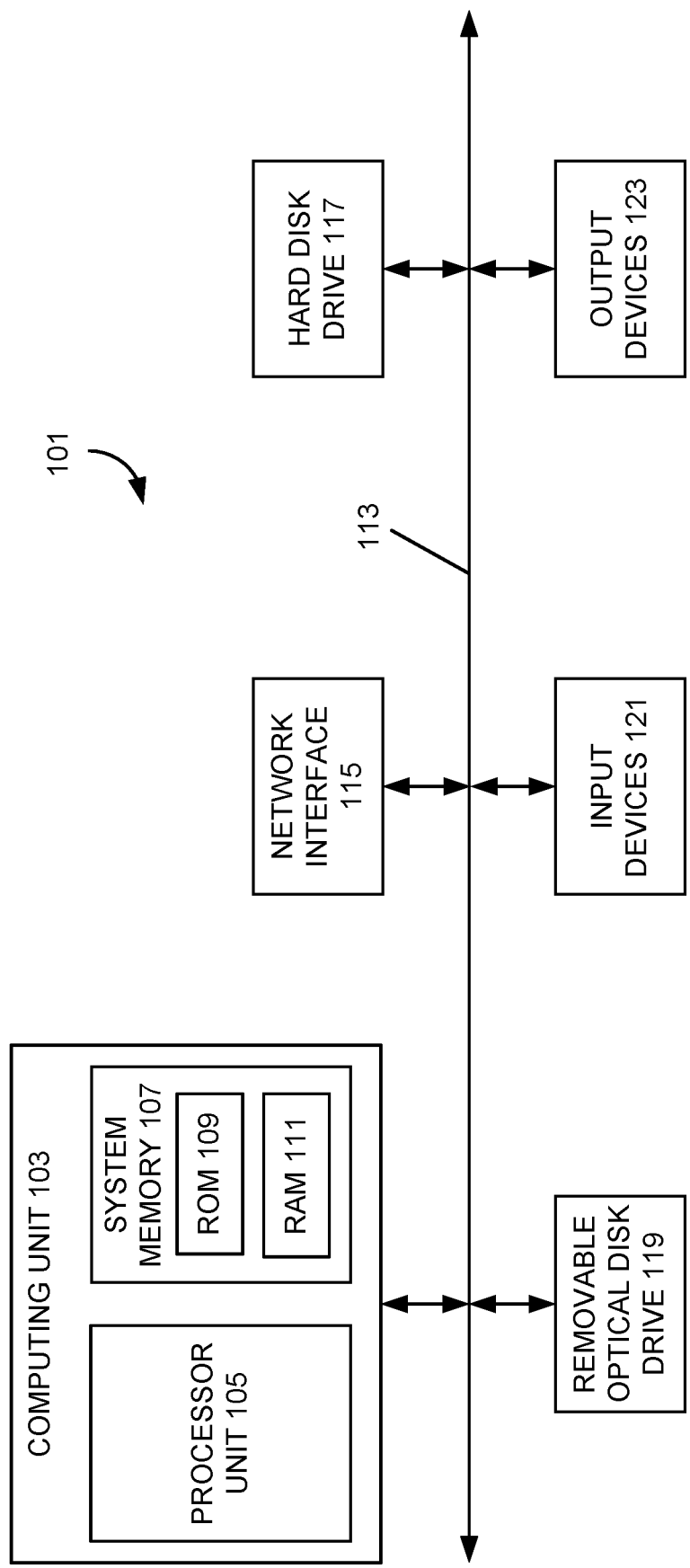
FIGS. 1 and 2 illustrate an example of a computer system of the type that may be used to implement various embodiments of the invention.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
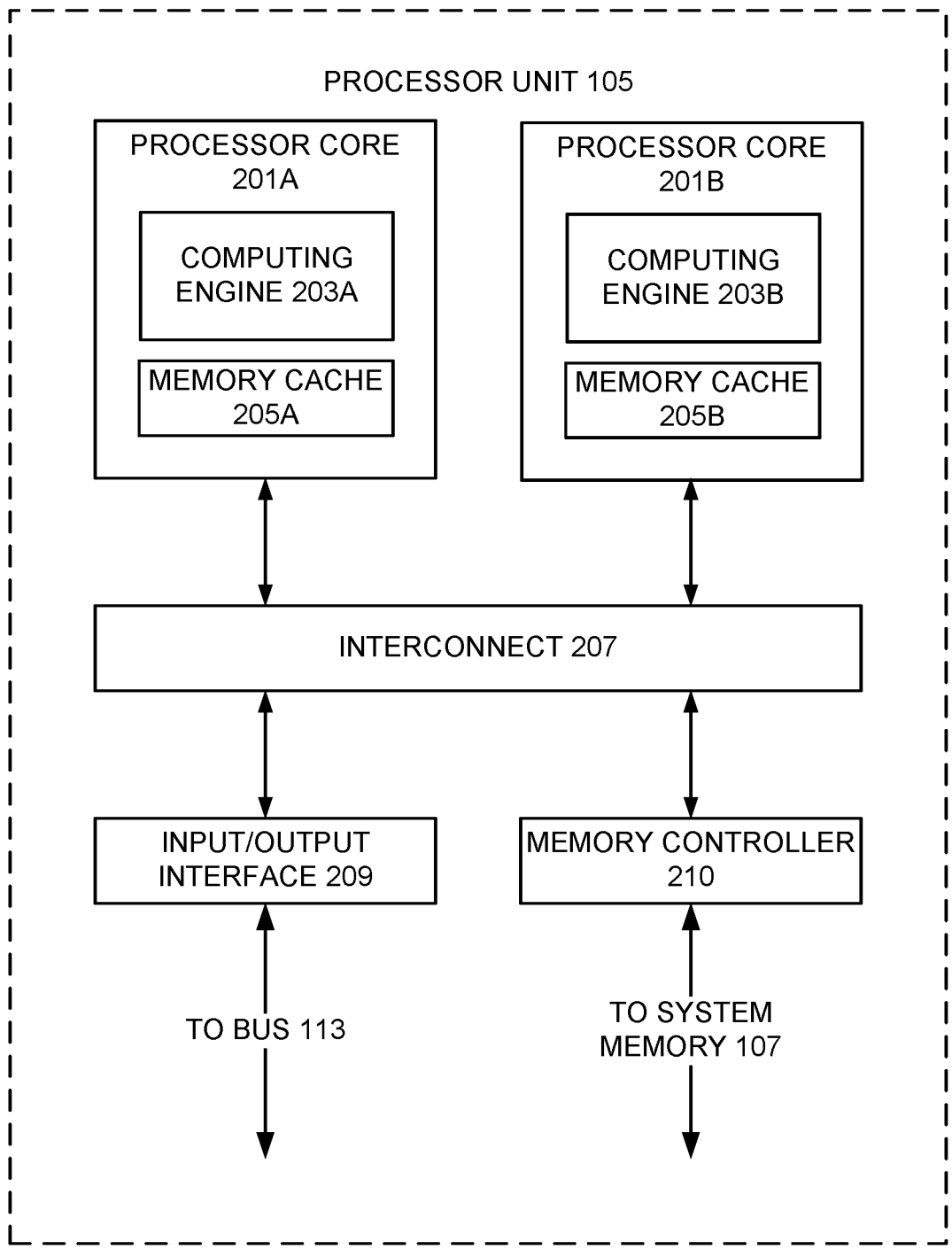

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments of the invention.

Detailed herein are methods, apparatuses, and systems for analyzing circuit channels, typically channels designed to carry high-speed signals. The disclosed methods, apparatus, and systems may be used, for example, in a printed circuit board or an integrated circuit design flow to analyze signal integrity. The disclosed methods, apparatus, and systems should not be construed as limiting in any way. Instead, the present disclosure is directed toward all novel and nonobvious features and aspects of the various disclosed methods, apparatus, systems, and equivalents thereof, alone and in various combinations and sub-combinations with one another. The present disclosure is not limited to any specific aspect or feature, or combination thereof, nor do the disclosed methods, apparatus, and systems require that any one or more specific advantages be present or problems be solved.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the figures may not show the various ways in which the disclosed methods, apparatus, and systems can be used in conjunction with other methods, apparatus, and systems. Additionally, the description sometimes uses terms like "generate" and "determine" to describe the disclosed methods. These terms are high-level abstractions of the actual operations that are performed. The actual operations that correspond to these terms may vary depending on the particular implementation and are readily discernible by one of ordinary skill in the art.

Various implementations of the invention may be employed to analyze a channel to determine signal integrity. For example, traces, vias or other interconnects between a driver and a receiver in a printed circuit board layout may be evaluated. The signal integrity of a digital circuit may, in some examples, be presented as a bit error rate, which can correspond to a measure of degradation a value sequence undergoes as a result of its being transmitted through the digital circuit. In addition to the bit error rate, the signal integrity of a channel is often analyzed by creating an "eye" diagram. Eye diagrams can be created through a variety of techniques, such as by repeatedly sampling a digital signal on the channel, for example, with signal measurement tools, such as an oscilloscope, and overlaying the various samples onto each other, by simulating transmission of the digital signals on the channel and overlaying simulated digital signals, or by performing statistical simulation of the channel.

Figure 3:
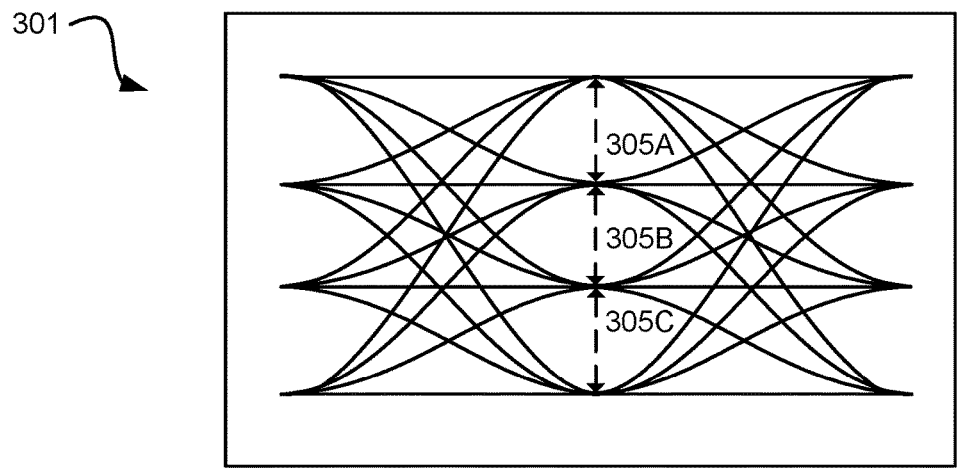
FIG. 3 illustrates an example undistorted eye diagram.

FIG. 3 illustrates an example undistorted eye diagram 301. Referring to FIG. 3, the undistorted eye diagram 301 can show various transitions on a channel carrying a four-level modulated signal, for example, a signal having a four-level pulse amplitude modulated (PAM) encoding, also called PAM-4 encoding. The x-axis of the undistorted eye diagram 301 can correspond to a value interval for the channel, while the y-axis can correspond to an amplitude of a channel voltage. The value interval can correspond to a period of time that a value can be transmitted over a channel, and the amplitude of the channel voltage during that time period can correspond to the value being transmitted during the value interval.

The undistorted eye diagram 301 can overlap signals transmitted over multiple different value intervals on the channel, for example, showing the signal as it transitions between different its different values. The undistorted eye diagram 301 can become distorted due to various electronic effects, for example, noise, timing issues, overshoot or undershoot can manifest themselves as amplitude and phase errors. Since these amplitude and phase errors can shrink the openings 305A-305C in the eye diagram 301, the openings 305A-305C in the eye diagram 301 can be utilized to quantify the errors in the transmission of signals over the channel.

Various implementations of the invention analyze the signal integrity of a channel within an electronic device. For example, a printed circuit board, application-specific integrated circuits (ASICs), including mixed-signal application-specific integrated circuits, systems-on-a-chip (SoCs), programmable logic devices (PLDs), such as field programmable gate arrays (FPGAs), fiber-optic transmission networks, optical channels, such as an optical channel between two components of an integrated circuit. Furthermore, techniques can also be employed to evaluate the integrity of power carrying channels. As stated above, a physical electronic device may be employed in various implementations of the invention. However, with various other implementations of the invention, a simulated or statistically-simulated instance of the electronic device can be employed.

Any of the methods or techniques described herein can be performed using software that comprises computer executable instructions for causing a computer to perform the methods or techniques stored on one or more computer readable memory device. Such software can comprise, for example, an electronic design automation (EDA) tool, such as a signal integrity tool. The Hyperlynx tool available from Mentor Graphics Corporation of Wilsonville, Oreg. is one example of a suitable software tool. With various implementations of the invention, the software may be executed on a single computer. With other implementations, the software may be executed upon a networked computer system. For example, via the Internet, a wide-area network, a local-area network, a client-server network, or other such network. For clarity, only certain selected aspects of the software based implementations are described. Other details that are well known in the art are omitted. For example, it should be understood that the disclosed technology is not limited to any specific computer language, program, or computer and that the disclosed technology can be implemented using any commercially available computer. An illustrative computing environment is described, but it is to be understood that this environment is not limiting and although all possible computing environments are not described, those of skill in the art are still capable of practicing the invention based upon the following disclosure.

Various implementations of the invention may use circuit design information. For example, printed circuit board layout information, such as a .HYP file, device models such as IBIS models, netlists, GDSII descriptions, or HDL descriptions such as Verilog or VHDL description, or other similar layout or device design description stored on one or more computer readable memory device. In certain implementations, the circuits to be simulated are instantiated as SPICE or Eldo models for simulation. For presentation purposes, the present disclosure sometimes refers to circuit components by their physical counterparts, such as drivers, channels, signals, and other such terms. It should be understood, however, that any such reference not only includes the physical components but also representations of such circuit components and signals on the components as may be used in a computer implemented signal integrity analysis environment.

Electrical System Including a Channel

Figure 4:
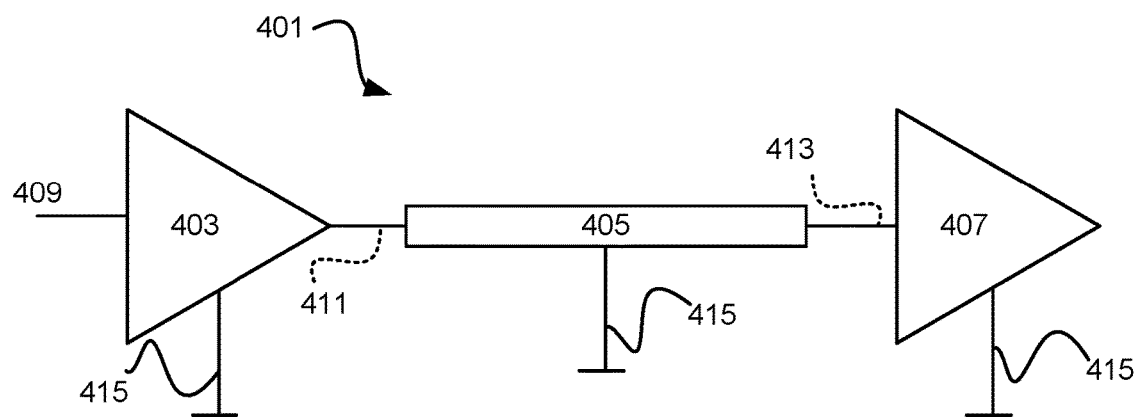
FIG. 4 illustrates an example electrical system.

FIG. 4 illustrates an exemplary electrical system 401. Referring to FIG. 4, the electrical system 401 includes a driver 403, a channel 405, and a buffer or receiver 407. With various implementations of the invention, the driver 403 can be a non-linear driver. In general, an electrical component can exhibit non-linear behavior when the sum of its responses does not equal the sum of its inputs. More particularly, in a linear system with a channel carrying binary signaling, the response to the bit sequence '010' summed with the response to the bit sequence '001' would equal the response to the bit sequence '011'. The principle of linearity is often explained mathematically as follows. Given a function F wherein $Y_1 = F(X_1)$ and $Y_2 = F(X_2)$, if $X_s = X_1 + X_2$ then $Y_s = F(X_s) = Y_1 + Y_2$. In a non-linear system, the response to the bit sequence '011' may not equal the summed responses to the bit sequences '010' and '001'. Employing the same function F, and $Y_1$, $Y_2$, and $X_s$ defined above, in a non-linear system $Y_s = F(X_s) \neq Y_1 + Y_2$.

As can be seen in FIG. 4, the driver 403 includes an input 409 for receiving a digital signal, or d(t). Additionally, the driver 403 and the buffer 407 are connected by the channel 405. When a digital signal d(t) is placed on the driver 403 via the input 409, a response or voltage waveform, or V(t) is seen at the channel 405. The voltage waveform V(t) is often referred to as the driver voltage, or the transmitter voltage. The response of the driver 403 is measurable at a point 411 in the electrical system 401. Additionally, the response of the channel, or W(t), often referred to as the waveform at the receiver, or the receiver voltage, and is measurable at a point 413 in the electrical system 401. Furthermore, as can be seen in FIG. 4, the driver 403, the channel 405, and the buffer 407 are typically connected to a plurality of ground terminals 415.

As indicated above, the illustrative systems represented in FIG. 4, as well as other electrical systems may be actual physical devices. Accordingly, the signals, voltages and currents present in the system may be measured for example, by an oscilloscope. However, more often, various implementations of the invention will be practiced in conjunction with a simulated instance of the electrical system. Accordingly, the signals, voltages, currents and other values present in the system may be simulated as well.

Additionally, those of skill in the art will appreciate that various tools exists for describing an electrical system mathematically. More particularly, various mathematical tools exist for describing the properties of an electrical system in the time domain and the frequency domain. The equations described herein may be further modified and converted using the available tools, for example, the Laplace or Fourier transforms. Such conversions and modification of the described methods and exemplary implementations of the invention are within the scope of this disclosure.

Figure 5:
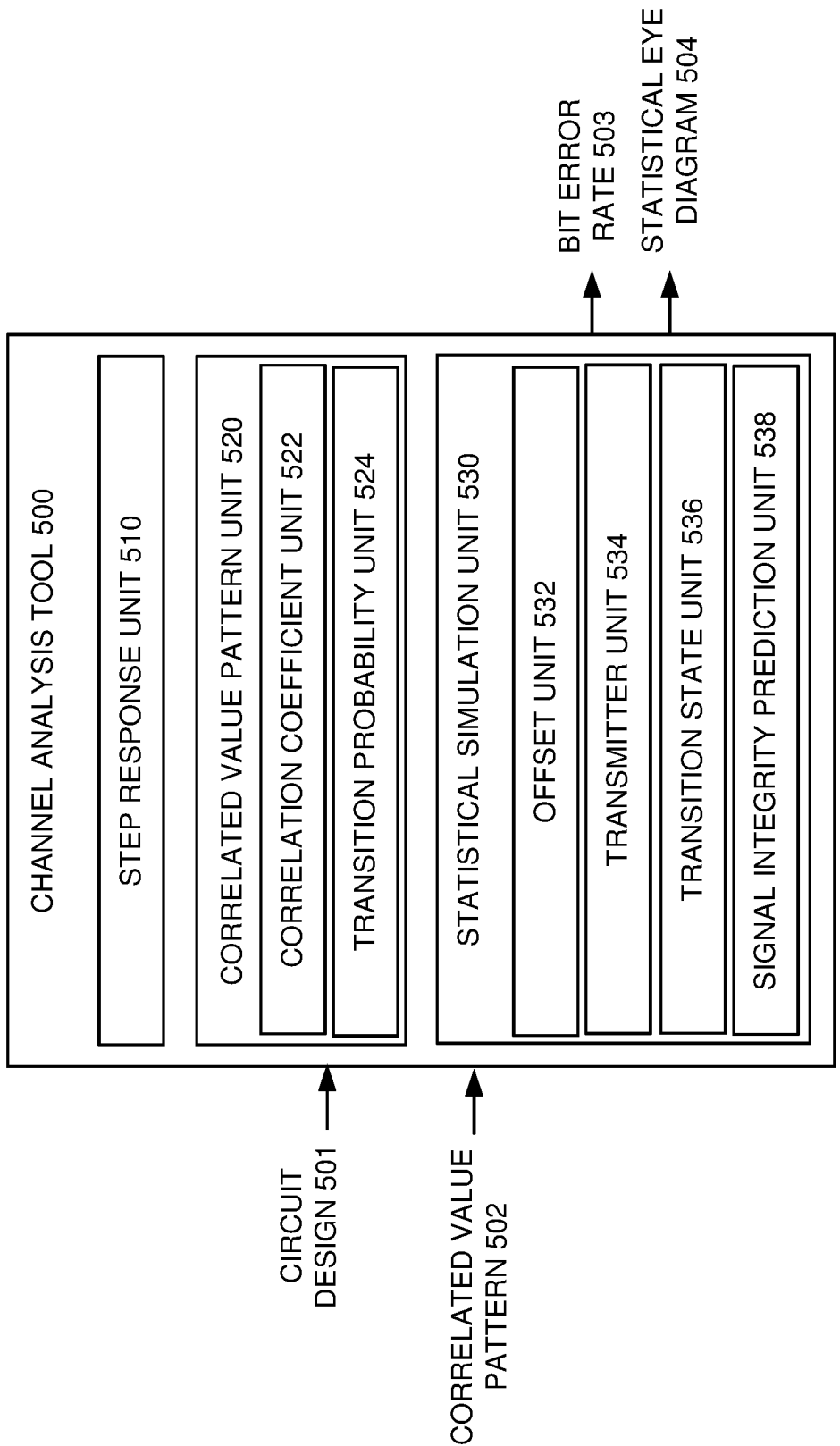
FIG. 5 illustrates an example channel analysis tool to perform statistical simulation on a channel receiving a correlated value pattern according to various embodiments of the invention.
Figure 6:
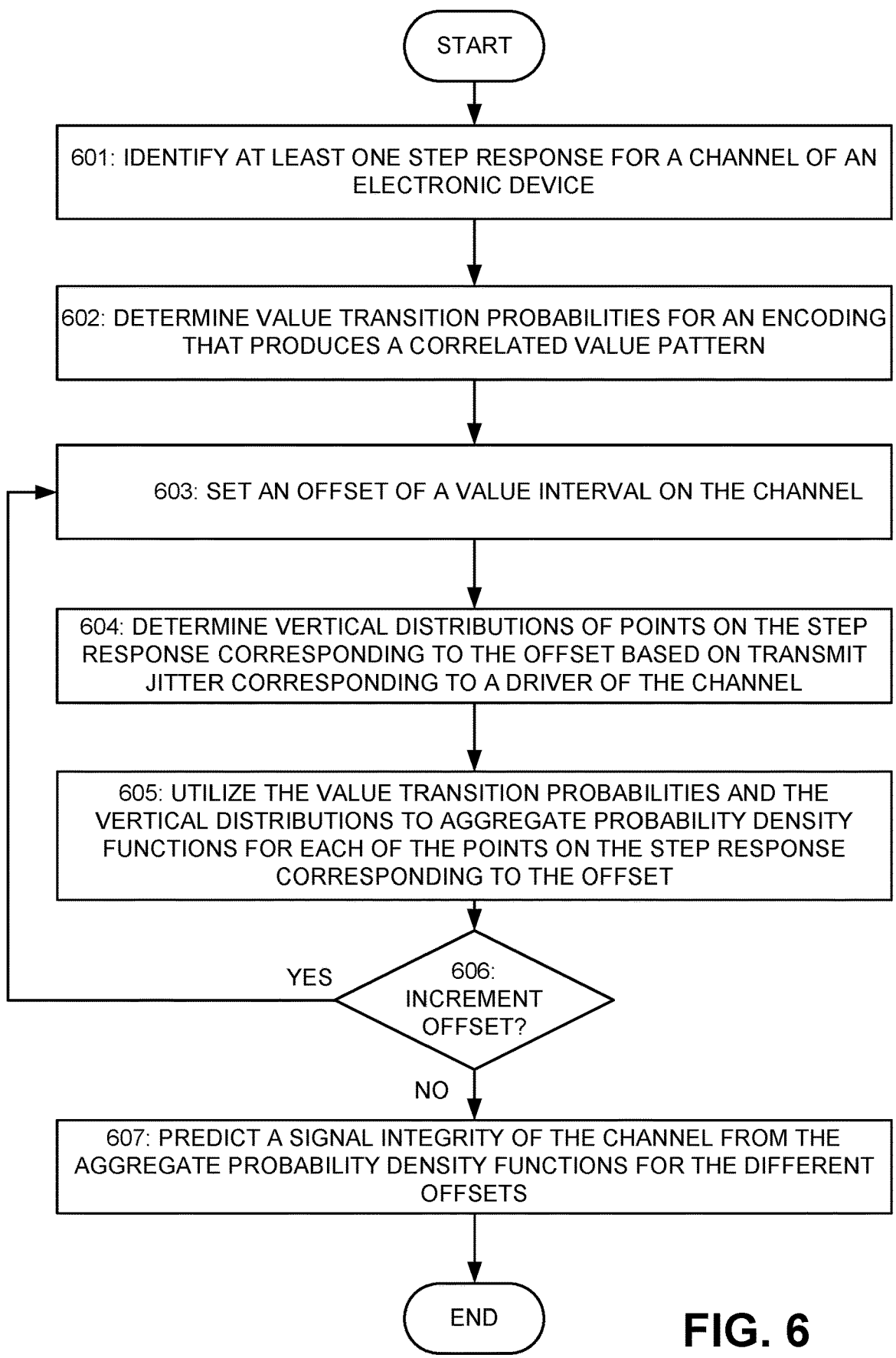
FIG. 6 illustrates a flowchart showing an example process for implementing statistical simulation on the channel receiving the correlated input pattern in FIG. 5.

Statistical Simulation on a Channel Receiving a Multiple-Level Correlated Value Pattern FIG. 5 illustrates an example channel analysis tool 500 to perform statistical simulation on a channel receiving a correlated input pattern according to various embodiments of the invention. FIG. 6 illustrates a flowchart showing an example process for implementing statistical simulation on the channel receiving the correlated input pattern in FIG. 5. Referring to FIGS. 5 and 6, in a block 601, a computing system implementing the channel analysis tool 500 can identify at least one step response or transition edge for the channel of an electronic device. The step response or transition edge can correspond to a reaction of the channel to a voltage signal transition, for example, from a lower-to-higher level or higher-to-lower level through the channel. The step response or transition edge can electrically characterize the channel.

The channel analysis tool 500 can include a step response unit 510 to identify one or more step responses of the channel, in some embodiments, by performing a circuit simulation of the channel described in a circuit design 501, e.g., using analytical models of the channel, SPICE models, IBIS models, transistor-level models, ideal voltage source models, or other such models. In other implementations, the step response can measured from a test chip or other physical chip implementing the channel under consideration. In some embodiments, when the channel is configured to carry voltage signals modulated to have more than two signaling levels, the channel may have multiple transition edges or step responses, for example, for the transitions between the different signaling levels. For example, when a signal has 4 signaling levels, the step response unit 510 may be able identify 12 different transition edges or step responses.

In some embodiments, when the channel is driven by a non-linear transmitter or driver, the channel may have different transition edges or step responses for a same transition between voltage levels, the shape of which can be based on values having been transmitted over the channel prior to the value transition. The number of these previously transmitted values that can affect the shape of the transition edges or step responses can be called a pre-history or history depth. For example, when the voltage signals has 4 signaling levels and the pre-history corresponds to one previous value, the step response unit 510 can identify as many as 48 different transition edges or step responses.

Figure 7:
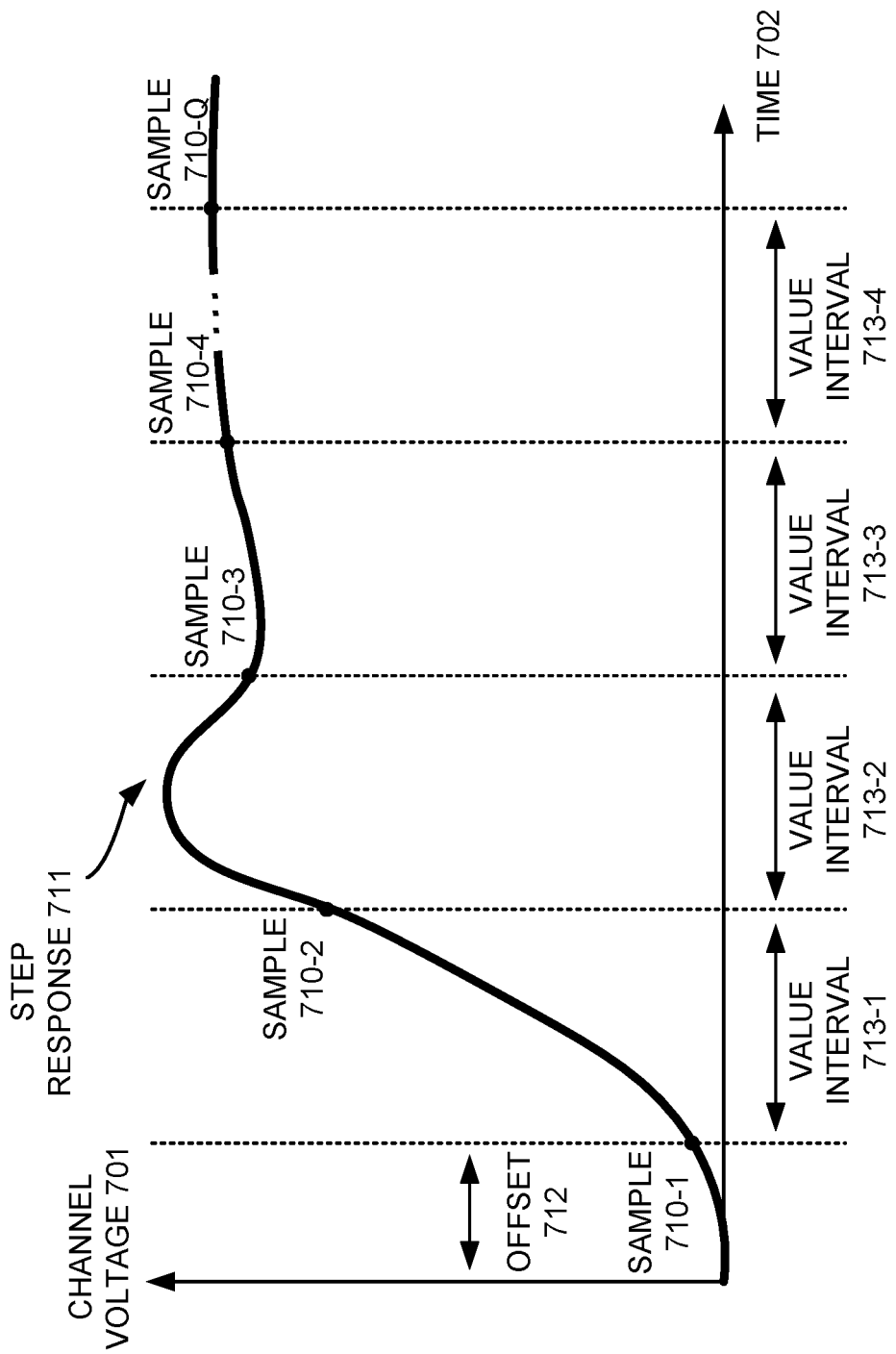
FIG. 7 illustrates an example step response of a channel being evaluated with statistical simulation according to various examples of the invention.

FIG. 7 illustrates an example step response of a channel being evaluated with statistical simulation according to various examples of the invention. Referring to FIG. 7, an x-y coordinate graph has a channel voltage 701 corresponding to the y-axis and time 702 corresponding to the x-axis. The graph shows a step response 711 of the channel over time 702, which, in this instance, corresponds to a channel voltage transition from a lower voltage level to a higher voltage level. The lower voltage level can correspond to the lowest voltage amplitude or to an intermediate voltage level amplitude on the channel, while the higher voltage level can correspond to the highest voltage amplitude or to an intermediate voltage level amplitude on the channel.

As will be described below in greater detail, the statistical simulation process can identify sample points 710-1 to 710-Q in the step response 711 of the channel. In some embodiments, these sample points 710-1 to 710-Q can be periodic corresponding to a value interval 713-1 to 713-4 of transmissions on the channel. The initial sample 710-1 can be taken after an initial offset 712, for example, that can have a value set between zero to a duration of a value interval. In some embodiments, a higher voltage level to a lower voltage level step response can be the inverse or negative of the lower voltage level to a higher voltage level step response 711 shown in FIG. 7.

Referring back to FIGS. 5 and 6, the channel analysis tool 500 can receive a correlated value pattern 502, which can describe a protocol or encoding scheme, such as four-level pulse-amplitude modulated (PAM-4) encoding or other types of multi-level encoding, which can be utilized to encode an input value pattern driven onto the channel. Since scramblers or synch-transition based pattern generators, for example, that implement the correlated value pattern 502, support DC balance on the channel during transmission and limit transition density and run length, i.e., a number of consecutive digital the same values in an input to the channel, the different levels of the correlated value pattern 502 are not statistically independent from each other. In other words, the correlated value pattern 502 will include level or value sequencing in which it is more probable that after one value the following value will be a different value. The channel analysis tool 500 can include a correlated value pattern unit 520 to analyze the correlated value pattern 502 to determine transition probabilities between the different levels for the encoding or protocol that produces the correlated value pattern 502, which is also shown in a block 602 of FIG. 6.

In some embodiments, the values of the correlated value pattern 502 can be described by a set of correlation coefficients. The correlated value pattern unit 520 can include a correlation coefficient unit 522 to determine the set of correlation coefficients from the correlated value pattern 502. In some embodiments, the correlation coefficient unit 522 can analyze the correlated value pattern 502 to determine its spectral density. Since the spectral density of a correlated value pattern can be related to a correlation function including at least some of the correlation coefficients in the set, for example, by a Fourier transform, the correlation coefficient unit 522 can determine at least some of the correlation coefficients in the set from the spectral density of the correlated value pattern 502. In some embodiments, second and higher-order correlation coefficients in the set can be found from analyzing a pattern generator implementing the encoding to the protocol. For example, by running test values with the pattern generator implementing the encoding to the protocol, the correlation coefficient unit 522 can estimate of the second and higher-order correlation coefficients in the set.

In some embodiments, the set of correlation coefficients for the correlated value pattern 502 can correspond to a number of value levels (L) and a number of pre-history values (N). When the encoding scheme has symmetry, a number of correlation coefficients for the correlated value pattern 502 can be determined from the following equation: $P_{N,L,Sym}=L^N*(L-1)/2$. For example, in a 4 level signal encoding with the pre-history equaling 1, meaning no prior values effect the current value transition, the set of correlation coefficients can be equal to 6. If the encoding for the correlated value pattern 502 does not include symmetry, however, the number of correlation coefficients for the correlated value pattern 502 can be determined from the following equation: $P_{N,L,Sym}=L^N*(L-1)$. For example, when in a 4 level signal encoding with the pre-history equaling 1, meaning no prior values effect the current value transition, the set of correlation coefficients can be equal to 12.

When the pre-history increases, for example, so that N=2 or one previous value influence transitions and correlation in the correlated value pattern 502, the set of correlation coefficients can include 24 coefficients for a symmetrical encoding and 48 for an asymmetrical encoding. The different sets of correlation coefficients discussed above, are shown below in Table 1.

TABLE 1

| Levels | Pre-History | No. of Coefficients | Correlation Coefficients | |
|---|---|---|---|---|
| L | N | PL | Symmetrical | Asymmetrical |
| 4 | 1 | 12 | $b_0^2$, $b_0b_1$, $b_0^2b_1^2$, $b_0^3b_1$, $b_0b_1^3$, $b_0^3b_1^3$ | $b_0$, $b_0^2b_1$, $b_0b_1^2b_0^3$, $b_0^3b_1^2$, $b_0^2b_1^3$ |
| 4 | 2 | 48 | $b_0^2$, $b_0b_1$, $b_0b_2$, $b_0^2b_1^2b_0^2b_2^2$, $b_0b_1^3$, $b_0b_2^3$, $b_0^3b_1 b_0^3b_2$, $b_0^3b_1^3$, $b_0^3b_2^3$, $b_0^2b_1b_2$, $b_0b_1^2b_2$, $b_0b_1b_2^2b_0^2b_1^2b_2^2$, $b_0^3b_1^2b_2$, $b_0^3b_1b_2^2b_0b_1^3b_2^2 b_0b_1^2b_2^3$, $b_0^2b_1b_2^3$, $b_0^3b_1^3b_2^2$, $b_0^3b_1^2b_2^3 b_0^2b_1^3b_2^3b_0b_1^3b_2^3 b_0^3b_1^3b_2^3$ | $b_0$, $b_0^3$, $b_0^2b_1$, $b_0b_1^2$, $b_0^2b_2$, $b_0b_2^2$, $b_0^3b_1^2$, $b_0^2b_1^3$, $b_0^3b_2^2$, $b_0^2b_2^3$, $b_0^2b_2^3$, $b_0b_1b_2$, $b_0^3b_1b_2$, $b_0b_1^3b_2$, $b_0b_1b_2^3$, $b_0^2b_1^2b_2$, $b_0^2b_1b_2^2$, $b_0^2b_1^2b_2^3 b_0^3b_1^3b_2$, $b_0^3b_1b_2^3$, $b_0^3b_1b_2^3$ |

Table 1 lists the correlation coefficients, separated by commas, for four-level encoded signals having no pre-history (N=1) and a pre-history of 1 value (N=2). Each individual coefficient includes at least one symbol $b_k$ located by the correlation coefficient unit 522 in analyzing the correlated value pattern 502 as described above. In some embodiments, the powers or multipliers associated with a symbol in a correlation coefficient may be smaller than the number of value levels (L).

The correlated value pattern unit 520 can include a transition probability unit 524 to determine the transition probabilities from the set of correlation coefficients. In some embodiments, the transition probability unit 524 can form a system of equations with the coefficients and solve the system of equations to identify the transition probabilities. An example of determining transition probabilities from a set of correlation coefficients for a two-level encoding was described in U.S. patent application Ser. No. 14/793,579, filed Jul. 7, 2015 and incorporated herein by reference. A similar technique for determining of transition probabilities can be utilized to determine transition probabilities from the set of correlation coefficients that the correlation coefficient unit 522 determined for the correlated value pattern 502 having more than two value levels.

The channel analysis tool 500 can include statistical simulation unit 530 to predict a signal integrity of the channel receiving the correlated value pattern 502 based on the at least one step response identified by the step response unit 510 and the transition probabilities determined by the correlated value pattern unit 520. The statistical simulation unit 530 can predict the signal integrity by building an eye diagram through statistical simulation. In some embodiments, the statistical simulation unit 530 can build the eye diagram by separately determining probability density functions for multiple different vertical cross-sections of the eye diagram. These probability density functions can represent a channel voltage transition for the different signaling levels.

Figure 8A:
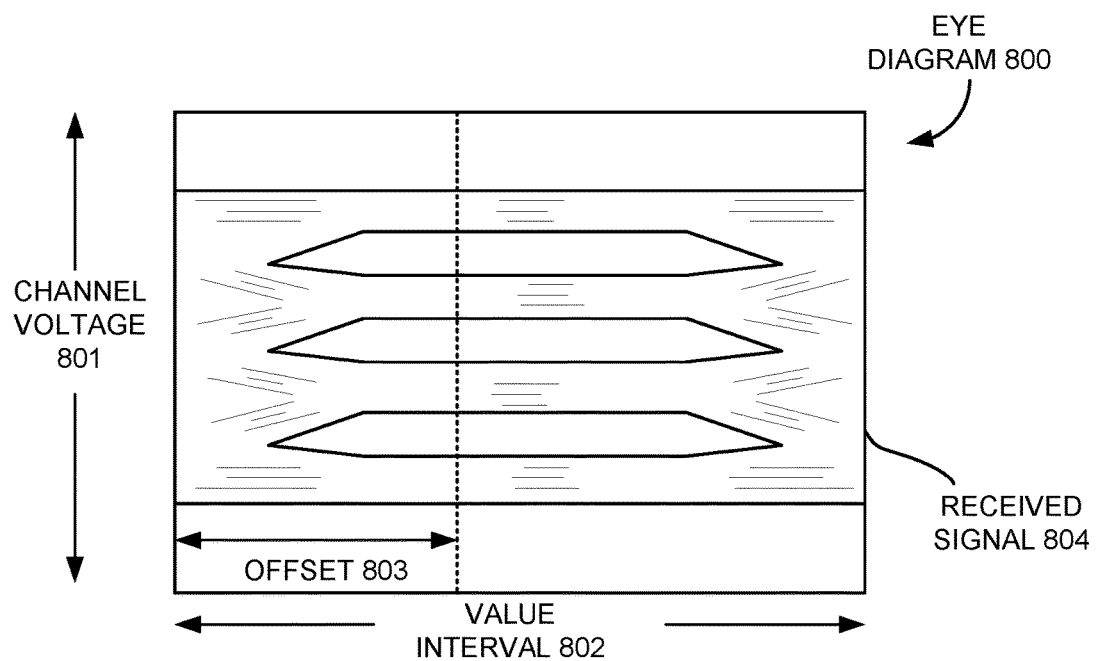
FIGS. 8A and 8B illustrate an example eye diagram and an example vertical cross-section of the eye diagram, which show signal integrity of a circuit pathway, built by statistical simulation of the channel according to various examples of the invention.
Figure 8B:
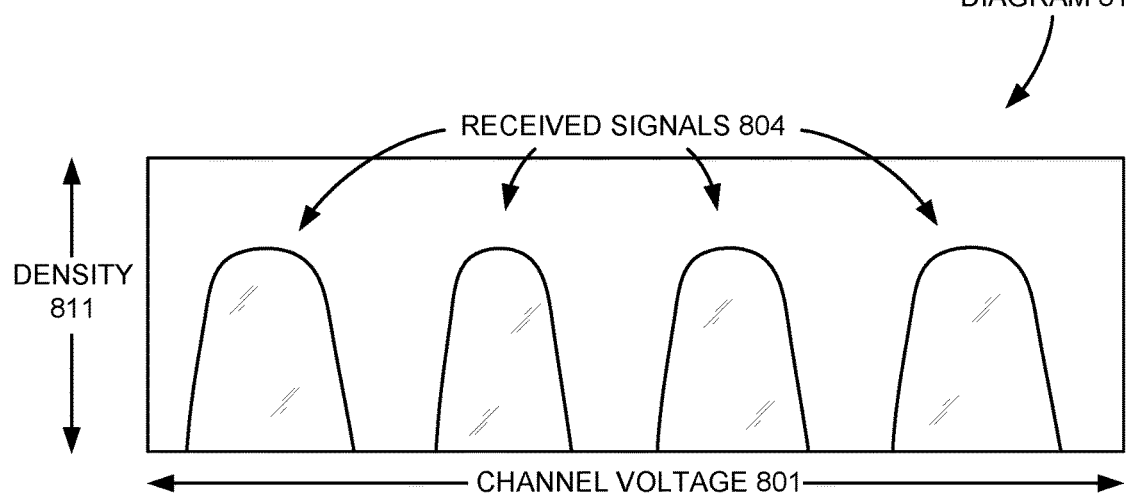

FIGS. 8A and 8B illustrate an example eye diagram 800 and an example vertical cross-section of the eye diagram 810, which show signal integrity of a circuit pathway, built by statistical simulation of the channel according to various examples of the invention. Referring to FIGS. 8A and 8B, an eye diagram 800 has a channel voltage 801 corresponding to the y-axis and a value interval 802 corresponding to the x-axis. The value interval 802 can correspond to a period of time that a value can be transmitted over the channel. The graph shows signals 804 received over the channel overlapped based on their corresponding value interval 802. The signals 804 in the eye diagram 800 can identify both their voltage at various times during the value interval 802, but, in some embodiments, also be presented as a density or frequency of their occurrence at a specific time-voltage intersection, for example, by their color in the eye diagram 800.

An offset 803 is also shown in FIG. 8A to illustrate how the offset 803 corresponds to the vertical cross-section in the eye diagram 810. The vertical cross-section of the eye diagram 810 can have the channel voltage 801 corresponding to the x-axis and a density 811 corresponding to the y-axis. The density 811 can correspond to a frequency or probability signals 804 received over the channel at different channel voltages 801. A magnitude of the received signals 804 in the vertical cross-section of the eye diagram 810 along the y-axis can be represented in the eye diagram of FIG. 8A as a color of the received signals 804. As will be discussed below in greater detail, the statistical simulation unit 530 can determine probability density functions for the vertical cross-section 810 in the value interval 802 associated with the offset 803, which will identify signal voltages at the vertical cross-section 810 of the value interval 802 and a density or frequency of their occurrence in the different points in the vertical cross-section of the value interval 802.

Referring back to FIGS. 5 and 6, the statistical simulation unit 530 can include an offset unit 532 to set an offset for a value interval on the channel. The offset for the value interval can correspond to a vertical cross-section of the eye diagram for the channel. For example, in a block 603, the computing system implementing the channel analysis tool 500 can set the offset of the value interval on the channel. The statistical simulation unit 530 can utilize the offset to determine various sample points in the at least one step response identified by the step response unit 510. In some embodiments, the sample points can be located in increments of one value interval, such that each sample point corresponds to a same vertical cross-section of the value interval for the channel.

The statistical simulation unit 530 can include a transmitter unit 534 to determine vertical voltage distributions capable of being seen on the channel during the at least one step response between the various voltage level for the channel. For example, in a block 604, the computing system implementing the channel analysis tool 500 can determine vertical distributions of points on the step response corresponding to the offset based on transmit jitter corresponding to a driver of the channel.

Since drivers or transmitters for the channel can be non-linear, transmit jitter can be introduced during transmission of the correlated value pattern 502 on the channel. This transmit jitter can be transmitting values early or late, which can affect signal integrity. In some embodiments, the transmit jitter can be random or deterministic, bounded or unbounded. The transmitter unit 534 can analyze the circuit design 501 or receive a characterization of the non-linear transmitter (not shown), and determine transmit jitter distributions corresponding to the different sample points identified by the statistical simulation unit 530 based on the offset.

The transmitter unit 534 can utilize the transmit jitter distributions and the at least one step response to determine vertical channel voltage distributions corresponding to each sample point identified by the statistical simulation unit 530 based on the offset. The vertical channel voltage distributions can each be a probability density function, which describes potential voltages of the at least one step response at a corresponding sample point given the time-based transmit jitter. These probability density functions also can ascribe a probability or weight associated with the potential voltages of the step response at a corresponding sample point.

Figure 9:
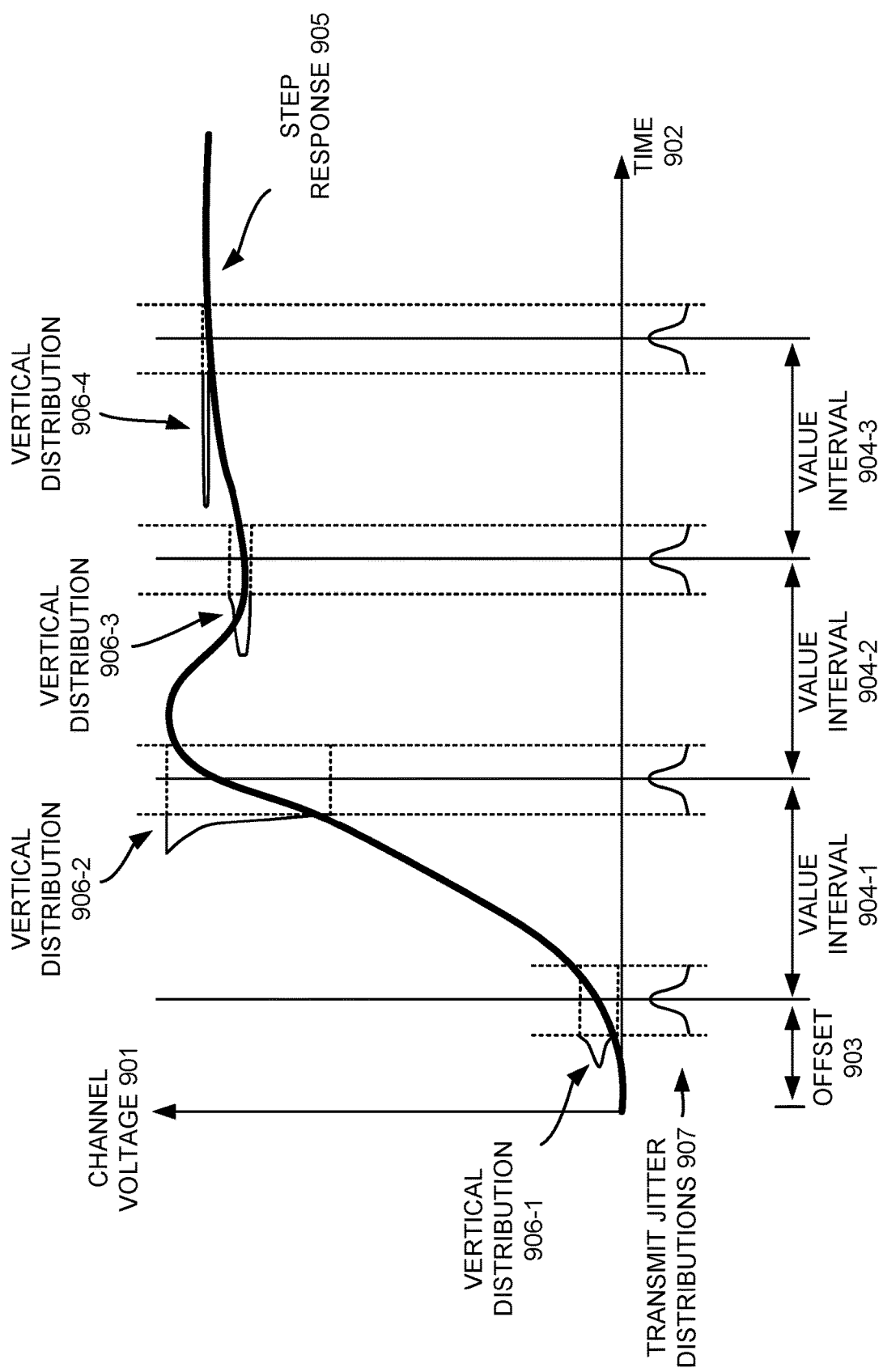
FIG. 9 illustrates an example step response of a channel with associated transmit jitter and vertical voltage distributions utilized with statistical simulation of the channel according to various examples of the invention.

FIG. 9 illustrates an example step response of a channel with associated transmit jitter and vertical voltage distributions utilized with statistical simulation of the channel according to various examples of the invention. Referring to FIG. 9, an x-y coordinate graph has a channel voltage 901 corresponding to the y-axis and time 902 corresponding to the x-axis. The graph shows a step response 905 of the channel over time 902, which, in this instance, corresponds to a channel voltage transition from a lower voltage value to a higher voltage value. In some embodiments, a higher voltage value to a lower voltage value step response can be the inverse or negative of the lower voltage value to the higher voltage value step response 905 shown in FIG. 9. Although FIG. 9 shows an example step response 905 between two voltage levels, in some embodiments, the example step response 905 may characterize voltage transitions between different voltage levels or different step responses may be utilized to characterize voltage transitions between different voltage levels.

The statistical simulation unit 530 can identify sample points in the step response 905 of the channel. In some embodiments, these sample points can be periodic corresponding to a value interval 904-1 to 904-3 of transmissions on the channel, which starts after an initial offset 903. The statistical simulation unit 530 can utilize the transmit jitter distributions 907 at each sample point of the step response 905 to determine possible voltages at each sample point in the presence of transmit jitter, which can be called vertical distributions 906-1 to 906-4. These vertical distributions 906-1 to 906-4 can be as probability density functions that identify potential voltages at each sample point as well as a probability or weight associated with each of the potential voltages of the step response at a corresponding sample point.

Referring back to FIGS. 5 and 6, since non-linear transmitters for channels can also introduce prehistory or history depth, which can create additional and different step responses for the channel based on previously transmitted values over the channel, the transmitter unit 534 also can determine the vertical voltage distributions for the multiple different step responses for the channel.

The statistical simulation unit 530 can include a transition state unit 536 to build a value state transition structure that describes value transitions in the correlated value pattern 502 based on their transition probabilities and, optionally, on the vertical voltage distributions associated with the value transitions. In some examples, the value state transition structure can be implemented by the computing system or in a programmable hardware device.

Figure 10:
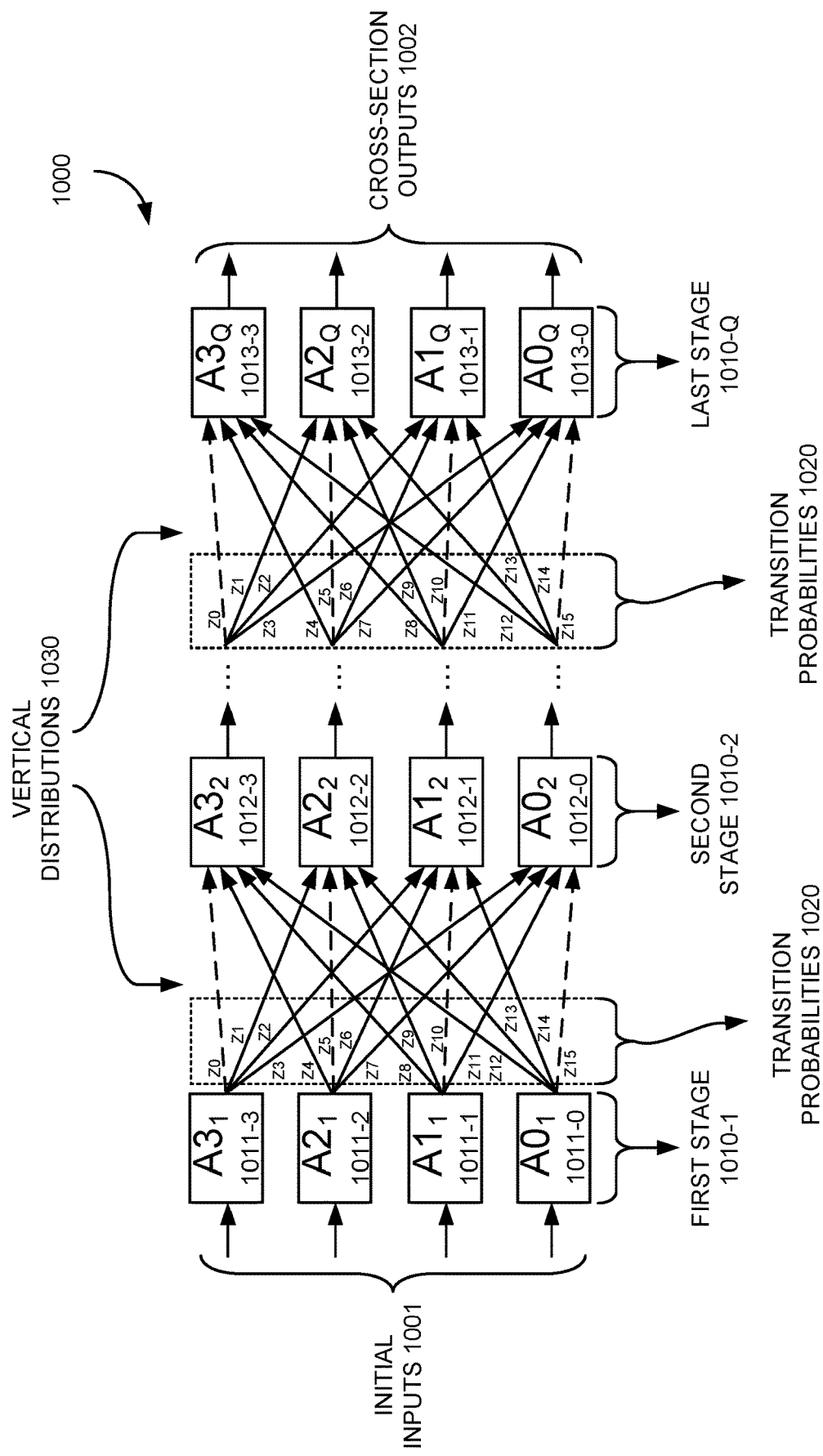
FIG. 10 illustrates an example value state transition structure utilized with statistical simulation of the channel according to various examples of the invention.

FIG. 10 illustrates an example value state transition structure 1000 utilized with statistical simulation of a channel according to various examples of the invention. Referring to FIG. 10, the value state transition structure 1000 describes value transitions in a correlated value pattern. In this example implementation of the value state transition structure 1000 there is no prehistory associated with the channel. In other implementations, a different value state transition structure can be built to accommodate prehistory values, for example, which would expand a number of state containers utilized in each stage of the value state transition structure 1000.

In this instance, the value state transition structure 1000 models a four-level signal encoding, such as PAM-4 encoding, and thus stages 1010-1 to 1010-Q include four state containers, i.e., one corresponding to each value level of the encoding. If the value state transition structure 1000 included a pre-history corresponding to one previous value, the number of state containers would double to 8. Likewise, if the value state transition structure 1000 included a pre-history corresponding to two previous values, the number of state containers would quadruple to 16.

The value state transition structure 1000 includes a first stage 1010-1 having multiple state containers 1011-0 to 1011-3, each corresponding to a different value level of the encoding. The value state transition structure 1000 can includes other stages, such as a second stage 1010-2 having multiple state containers 1012-0 to 1012-3 through a last stage 1010-Q having multiple state containers 1013-0 to 1013-3. The total number of stages 1010-1 to 1010-Q can be based on a number of samples in the step response(s) utilized by the value state transition structure 1000.

The state containers 1011-0 to 1011-3 in the first stage 1010-1 of the value state transition structure 1000 can receive initial inputs 1001 corresponding to an initial value of the encoding for the correlated value pattern. For example, the initial inputs 1001 can be based on a Dirac delta functions—having a voltage level in state containers corresponding to an initial voltage for each value level.

The value state transition structure 1000 can model value transitions in the correlated value pattern. For example, when a '0' value is transmitted after an initial value of '3' has been transmitted, the value state transition structure 1000 shows a transition from the state container 1011-3 in the first stage 1010-1 to the state container 1012-0 in the second stage 1010-2. In another example, when a '2' value is transmitted after a '1' value has been transmitted, the vale state transition structure 1000 shows a transition from the state container 1011-1 in the first stage 1010-1 to the state container 1012-2 in the second stage 1010-2. The value state transition structure 1000 can model all of the possible value transitions, while also be adapted by adding state containers to optionally take into account the prehistory associated with the channel. Value transitions in which the value does not change, i.e., a '0' value following a '0' value are represented with a dashed line in FIG. 10. The other value transitions in which the value changes are represented with a solid line in FIG. 10.

Each of the state containers 1011-0 to 1011-3 in the first stage 1010-1 can be loaded with the initial inputs corresponding to a probability density function, which is passed to the corresponding state containers 1012-0 to 1012-3 in the second stage 1010-2, as shown by the transition lines between the state containers.

The value state transition structure 1000 can include mechanisms to modify the probability density functions passed between the state containers of the different stages. The mechanisms can utilize transition probabilities 1020, shown as $Z_0$-$Z_{15}$ in FIG. 10, to apply weightings to the probability density functions transitioning between state containers between the different stages 1010-1 to 1010-Q. In this example, each state container in the stages 1010-2 to 1010-Q receives multiple probability density functions from state containers in a previous stage, which can be added together in the receiving state container.

The mechanisms also can utilize the vertical distributions 1030 corresponding to a particular sample point to modify the probability density functions transitioning between state containers between the different stages 1010-1 to 1010-Q. In some embodiments, the mechanism can selectively convolve the vertical distributions 1030 with the probability density functions transitioning between the different stages 1010-1 to 1010-Q when the transition changes value. When the vertical distributions 1030 were determined for lower level to higher level value transitions, and the mechanism utilizes them for higher level to lower level value transitions, the mechanism can convolve a negative or inverse of the vertical distributions 1030 with the probability density functions. In some embodiments, some of the states represented by any of the state containers can have different step responses and therefore have different vertical distributions derived by the transmitter unit 534. When there is prehistory associated with the channel, the mechanism can apply the vertical distributions from the step response(s) associated with prehistory of a corresponding state container.

The state containers 1013-0 to 1013-3 in the last stage 1010-Q can receive probability density functions from a previous stage (not shown), accumulate or aggregate them, and output cross-section outputs 1002 corresponding to the accumulated probability density functions. The cross-section outputs 1002 can correspond to different probability density functions associated with different voltage level on the channel. For example, the vertical cross-section of the eye diagram 810 in FIG. 8B can be a graphical representation of the cross-section outputs 1002.

Referring back to FIGS. 5 and 6, the statistical simulation unit 530 can include a signal integrity unit 538 to build a statistical eye diagram 504 utilizing the value state transition structure generated by the transition state unit 536. For example, in a block 605, the computing system implementing the channel analysis tool 500 can utilize the value transition probabilities and the vertical distributions to aggregate probability density functions for each of the points on the step response corresponding to the offset.

The signal integrity unit 536 can initially load a first stage of the value state transition structure with a Dirac delta functions—having a voltage level in state containers corresponding to an initial voltage for each value level. The signal integrity unit 536 can transition the Dirac delta functions from the state containers in the first stage of the value state transition structure to a second stage of the value state transition structure, while performing modifications corresponding to the last sample point (for example, sample 710-Q in FIG. 7) along the at least one step response. The signal integrity unit 536, after the move of the modified probability density functions in the second stage, can perform another transition between state containers, this time with the second to last sample point along the at least one step response. The signal integrity unit 536 can continue this process until all of the sample points (for example, sample 710-1 in FIG. 7) have had their vertical distributions selectively convolved with probability density functions.

The signal integrity unit 536 can aggregate the state containers for the different value state for all of the state containers, which corresponds to a specific vertical cross-section of the statistical eye diagram 504. In a block 606, the computing system implementing the channel analysis tool 500 can determine whether an additional offset of the value interval on the channel can be evaluated, for example, by incrementing offset previously set in block 603. If so, execution returns to block 603, where the computing system implementing the channel analysis tool 500 can set a new offset of the value interval on the channel. In some embodiments, the offset unit 532 in the statistical simulation unit 530 can select the new offset of the value interval on the channel. Since each offset corresponds to a different vertical cross-section of the eye diagram shown in FIG. 8, in some embodiments, the statistical simulation unit 530 can increment the offset, for example, by a preset value, across the value interval in order to realize aggregate probability density functions for the entire eye diagram—one cross-section at a time. In other embodiments, the statistical simulation unit 530 can analyze multiple offsets or cross-sections of the eye-diagram in parallel.

For example, if, in the block 606, the computing system implementing the channel analysis tool 500 determines to not evaluate an additional offset of the value interval on the channel, execution continues to a block 607, where the computing system implementing the channel analysis tool 500 can predict a signal integrity of the channel from the aggregate probability density functions for the different offsets.

The signal integrity prediction unit 538 also can generate a bit error rate 503 based on the statistical eye diagram 504, for example, by determining a ratio of signals in the statistical eye diagram 504 fall within a preset location towards the center of the eye in the statistical eye diagram 504 to those signals that fall outside of the preset location. This ratio can describe a number of transmission errors are predicted to occur given a correlated input pattern transmitted by a non-linear transmitter possibly causing multiple transition and transmit jitter.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   identifying, by a computing system, a channel in an electronic device is configured to transmit signals encoding data with more than two value levels in response to a correlated test input;
   determining, by the computing system, probabilities of value level changes in the transmitted signals based on an encoding for the correlated test input;
   generating, by the computing system, an eye diagram by utilizing the probabilities to identify weightings for the value level changes in the transmitted signals and combining portions of a step response of the channel based, at least in part, on the identified weightings for the value level changes in the transmitted signals, wherein the combined portions of the step response of the channel form at least a portion of the eye diagram; and predicting, by the computing system, a signal integrity of the channel configured to transmit the signals based, at least in part, on the eye diagram.

2. The method of claim 1, wherein predicting the signal integrity of the channel further comprising generating a bit error rate for the channel from the eye diagram.

3. The method of claim 1, further comprising identifying, by the computing system, correlation coefficients corresponding to the correlated test input, wherein determining the probabilities of value level changes in the transmitted signals is performed based on the correlation coefficients.

4. The method of claim 1, further comprising:
identifying, by the computing system, transmit jitter capable of being introduced by a transmitter of the correlated test input onto the channel;
measuring, by the computing system, a step response for the channel; and
determining, by the computing system, a vertical distribution of voltages in the step response of the channel based on the transmit jitter, wherein predicting the signal integrity of the channel is based on the vertical distribution of voltages in the step response of the channel and the determined probabilities of value level changes in the transmitted signals.

5. The method of claim 4, wherein the transmit jitter includes at least one of random jitter or deterministic jitter.

6. The method of claim 1, further comprising:
identifying, by the computing system, transmit jitter capable of being introduced by a transmitter of the correlated test input onto the channel;
measuring, by the computing system, multiple step responses of the channel that differ based, at least in part, on one or more values previously transmitted on the channel; and
determining, by the computing system, the vertical distributions of voltages in each of the multiple step responses of the channel based on the transmit jitter, wherein predicting the signal integrity of the channel is based on the vertical distribution of voltages in the step response of the channel and the determined probabilities of value level changes in the transmitted signals.

7. The method of claim 1, further comprising setting, by the computing system, an offset for a bit interval on the channel, wherein predicting the signal integrity of the channel further comprising utilizing the determined probabilities to aggregate probability density functions for multiple points in the step response of the channel corresponding to the offset.

8. A system comprising:
a memory system configured to store computer-executable instructions; and
a computing system, in response to execution of the computer-executable instructions, is configured to:
identify a channel in an electronic device is configured to transmit signals encoding data with more than two value levels in response to a correlated test input;
determine probabilities of value level changes in the transmitted signals based on an encoding for the correlated test input;
generate an eye diagram by utilizing the probabilities to identify weightings for the value level changes in the transmitted signals and combining portions of a step response of the channel based, at least in part, on the identified weightings for the value level changes in the transmitted signals, wherein the combined portions of the step response of the channel form at least a portion of the eye diagram; and predict a signal integrity of the channel configured to transmit the signals based, at least in part, on the eye diagram.

9. The system of claim 8, wherein the computing system, in response to execution of the computer-executable instructions, is further configured to predict the signal integrity of the channel by generating a bit error rate for the channel from the eye diagram.

10. The system of claim 8, wherein the computing system, in response to execution of the computer-executable instructions, is further configured to:
identify correlation coefficients corresponding to the correlated test input; and
determine the probabilities of value level changes in the transmitted signals based on the correlation coefficients.

11. The system of claim 8, wherein the computing system, in response to execution of the computer-executable instructions, is further configured to:
identify transmit jitter capable of being introduced by a transmitter of the correlated test input onto the channel;
measure a step response for the channel;
determine a vertical distribution of voltages in the step response of the channel based on the transmit jitter; and
predict the signal integrity of the channel based on the vertical distribution of voltages in the step response of the channel and the determined probabilities of value level changes in the transmitted signals.

12. The system of claim 8, wherein the computing system, in response to execution of the computer-executable instructions, is further configured to:
identify transmit jitter capable of being introduced by a transmitter of the correlated test input onto the channel;
measure multiple step responses of the channel that differ based, at least in part, on one or more values previously transmitted on the channel; and
determine the vertical distributions of voltages in each of the multiple step responses of the channel based on the transmit jitter; and
predict the signal integrity of the channel based on the vertical distribution of voltages in the step response of the channel and the determined probabilities of value level changes in the transmitted signals.

13. The system of claim 8, wherein the computing system, in response to execution of the computer-executable instructions, is further configured to:
set an offset for a bit interval on the channel; and
utilize the determined probabilities to aggregate probability density functions for multiple points in the step response of the channel corresponding to the offset.

14. An apparatus comprising at least one non-transitory computer-readable memory device storing instructions configured to cause one or more processing devices to perform operations comprising:
identifying a channel in an electronic device is configured to transmit signals encoding data with more than two value levels in response to a correlated test input;
determining probabilities of value level changes in the transmitted signals based on an encoding for the correlated test input; and
generating an eye diagram by utilizing the probabilities to identify weightings for the value level changes in the transmitted signals and combining portions of a step response of the channel based, at least in part, on the identified weightings for the value level changes in the transmitted signals, wherein the combined portions of the step response of the channel form at least a portion of the eye diagram; and predicting a signal integrity of the channel configured to transmit the signals based, at least in part, on the eye diagram.

15. The apparatus of claim 14, wherein predicting the signal integrity of the channel further comprising generating a bit error rate for the channel from the eye diagram.

16. The apparatus of claim 14, wherein the instructions are configured to cause the one or more processing devices to perform operations further comprising identifying correlation coefficients corresponding to the correlated test input, wherein determining the probabilities of value level changes in the transmitted signals is performed based on the correlation coefficients.

17. The apparatus of claim 14, wherein the instructions are configured to cause the one or more processing devices to perform operations further comprising:
identifying transmit jitter capable of being introduced by a transmitter of the correlated test input onto the channel;
measuring a step response for the channel; and
determining a vertical distribution of voltages in the step response of the channel based on the transmit jitter, wherein predicting the signal integrity of the channel is based on the vertical distribution of voltages in the step response of the channel and the determined probabilities of value level changes in the transmitted signals.

18. The apparatus of claim 17, wherein the transmit jitter includes at least one of random jitter or deterministic jitter.

19. The apparatus of claim 14, wherein the instructions are configured to cause the one or more processing devices to perform operations further comprising:
identifying transmit jitter capable of being introduced by a transmitter of the correlated test input onto the channel;
measuring multiple step responses of the channel that differ based, at least in part, on one or more values previously transmitted on the channel; and
determining the vertical distributions of voltages in each of the multiple step responses of the channel based on the transmit jitter, wherein predicting the signal integrity of the channel is based on the vertical distribution of voltages in the step response of the channel and the determined probabilities of value level changes in the transmitted signals.

20. The apparatus of claim 14, wherein the instructions are configured to cause the one or more processing devices to perform operations further comprising setting an offset for a bit interval on the channel, wherein predicting the signal integrity of the channel further comprising utilizing the determined probabilities to aggregate probability density functions for multiple points in the step response of the channel corresponding to the offset.

* * * * *